Oct. 2, 1962
A. H. M. SMULDERS
3,056,585
APPARATUS FOR PRODUCING A RELATIVE LINEAR DISPLACEMENT
BETWEEN A COLUMN AND A MOVABLE BODY BY
MEANS OF HYDRAULIC PRESSURE
Filed Jan. 29, 1959
2 Sheets-Sheet 1
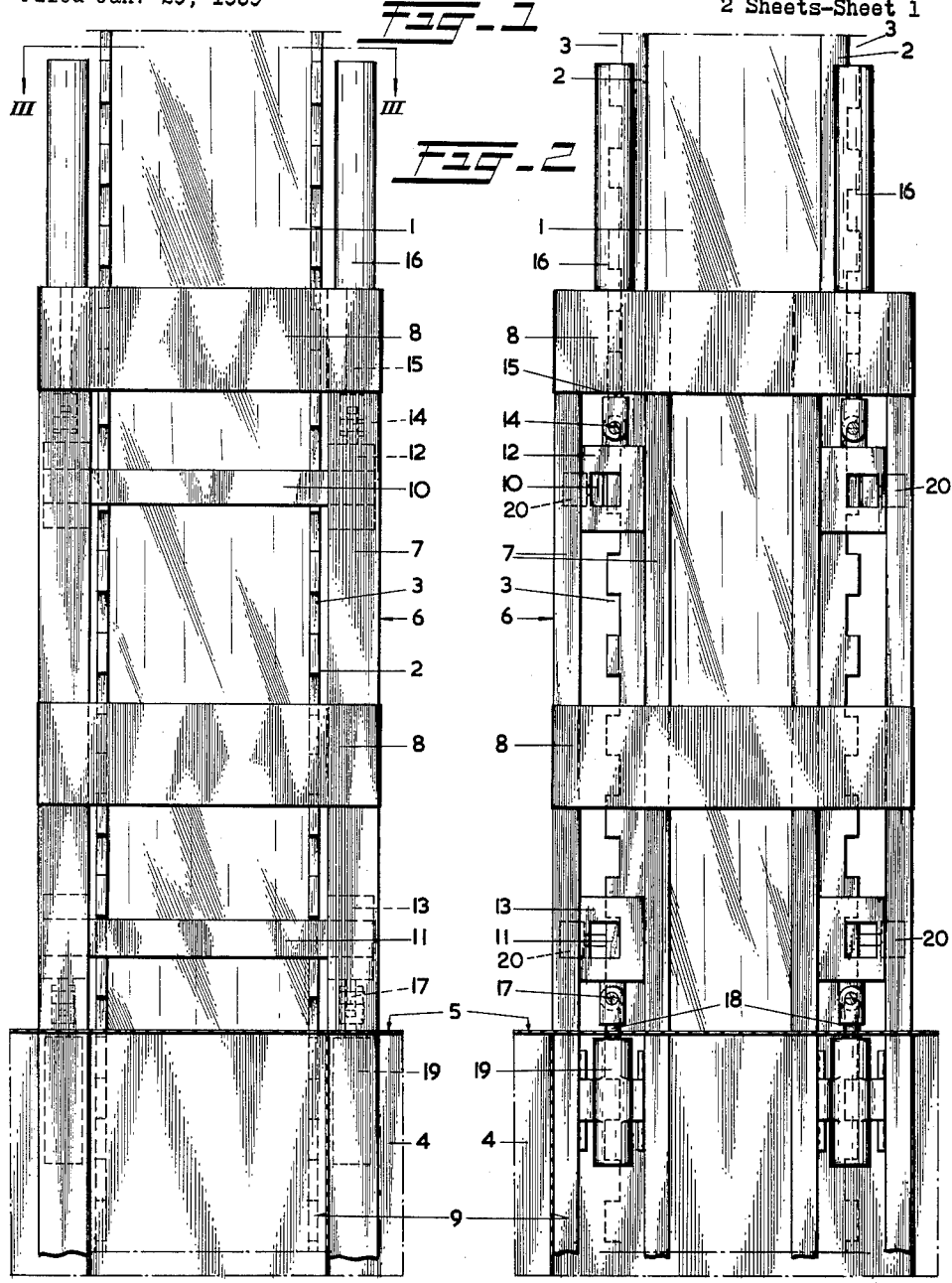

Fig. 3

United States Patent Office 3,056,585
Patented Oct. 2, 1962

3,056,585
APPARATUS FOR PRODUCING A RELATIVE LINEAR DISPLACEMENT BETWEEN A COLUMN AND A MOVABLE BODY BY MEANS OF HYDRAULIC PRESSURE
August Hendrik Maria Smulders, Wassenaar, Netherlands, assignor to N.V. Werf Gusto v/h Firma A. F. Smulders, Schiedam, Province of South Holland, Netherlands, a Dutch limited-liability company
Filed Jan. 29, 1959, Ser. No. 790,021
4 Claims. (Cl. 254—110)

The invention concerns an apparatus for producing a relative linear displacement between a column and a body movable along it (such as a pontoon) by means of hydraulic pressure, said apparatus comprising one or more working cylinders with pistons or plungers, fitted on the body while a number of regularly spaced recesses are present on the column, which recesses are adapted to cooperate with a set of driving and a set of blocking pawl members which are permanently connected with the body, the driving pawl members being fitted on the rods of the pistons or plungers. In this known apparatus the pawl members consist of arms that are comparatively short in the transverse direction, which arms can be brought into and out of engagement, by means of a rotation about the axis of the plunger rod, with the recesses which are formed by the free spaces between the projections extending far beyond the column.

The invention has for its object to furnish a construction which operates only with the aid of members moving in a straight line and by means of which very large forces can be transmitted, such as particularly with a movable drilling platform. This object is achieved by the fact that the column has a polygonal horizontal cross-section and is provided on the ribs or edges with teeth of small height, and that each pawl member has the form of a beam at right angles to the column, which beam is guided at both ends in tracks parallel to the column, means being present for moving the beam in the transverse direction away from the column and towards the column.

The apparatus according to the invention is preferably constructed in such a way that each end of the driving pawl members is enclosed in a crosshead, while the guiding track of each of these crossheads is formed by a set of slide plates connected with the body. By this measure the risk of a lateral displacement of the ends of the piston or plunger rods is avoided, which is of importance with a view to the sealing of the rod.

It is favourable if according to the invention each set of slide plates is secured in a derrick or supporting structure mounted on the body, while the working cylinder is mounted in such a way that its outgoing stroke is directed towards the body. This means that upon application of the invention to a movable drilling platform the greatest force can be exerted during the downward movement of the column, which is important with a view to the process of forcing the column into the ground and for the firm anchoring of the pontoon.

In order to make it possible under any circumstances to cause the blocking pawl members to engage a recess of the column, the apparatus according to the invention is constructed in such a way that the blocking pawl members are connected with the body so as to be vertically adjustable, in such a way that these pawl members can be displaced through a distance at least equal to the pitch of the recesses in the column. By this measure it is possible, even if the driving pawl members perform only part of a stroke, for the weight to be taken over by the blocking pawl members. If the invention is applied to a floating pontoon, great speed can be attained by this measure during the process of lifting and lowering the columns, because during the inoperative stroke of the driving pawl members the blocking pawl members can now perform a stroke and take along the columns in question. The blocking pawl members thus assume a driving function.

The blocking pawl members are preferably connected with the body by means of auxiliary cylinders, with pistons or plungers. This has the advantage that a single source of power, in this case a pump for pressure medium, suffices for the operation of the driving and the blocking pawl members.

It is a favourable feature if the length of the stroke of the driving pawl members is at least equal to twice the pitch of the recesses in the column. By this measure it is ensured that when the body is moved in relation to the fixed columns, irrespective of the position of each of the columns, a displacement is attained of at least one length of the pitch per cycle of movement of the driving and blocking pawl members.

The auxiliary cylinders and the supporting structure can be used to advantage when the apparatus according to the invention is constructed in such a way that each end of the blocking pawl members is enclosed in a crosshead, which is adapted to slide in slide plates secured in the supporting structure. This implies that the supporting structure is utilized for the driving as well as the blocking pawl members, and serves to guide and move these pawl members as well as to transmit the supporting forces. Under certain circumstances the auxiliary cylinder helps on both the operation of pulling up and that of pushing in the column.

The invention will be explained more fully with reference to the drawings, which illustrate part of an embodiment of the apparatus according to the invention in a diagrammatic way.

FIGURES 1 and 2 are two vertical elevations, at right angles to each other, of a part of a column and a pontoon that is movable along it, to be used as a movable drilling platform.

Figure 3:
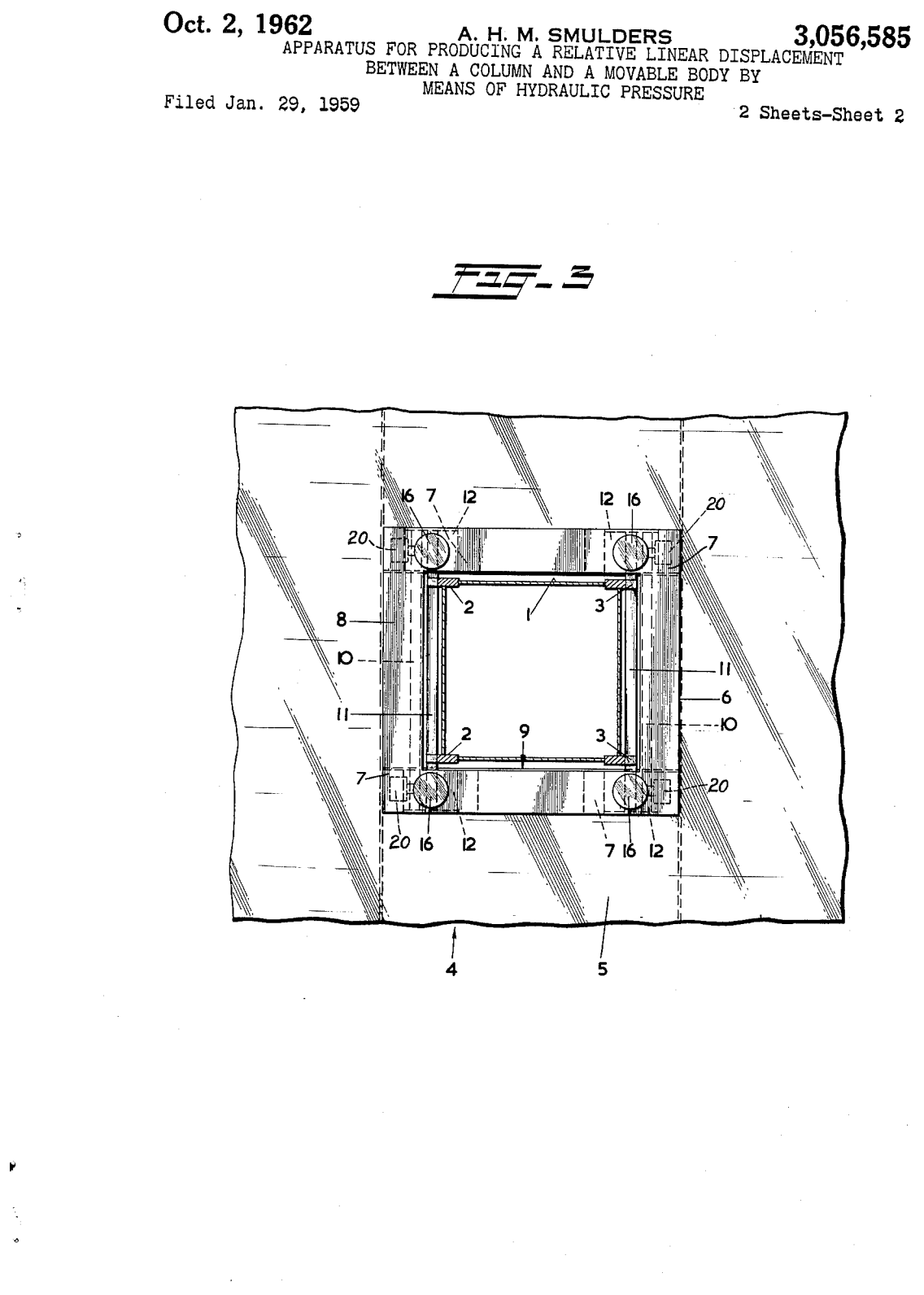

FIGURE 3 is a horizontal cross-section along the line III—III in FIGURE 1.

It will be understood that a number of columns may be associated with a single pontoon.

As can be seen in FIGURES 1 and 2, the column 1 consists of a pole of a square cross-section, provided along each of its ribs or edges with a strip 2 secured thereto by welding or in some other way, with regularly spaced recesses 3 alternating with crenels (square angled teeth). These strips 2 have been fastened in such a way that the recesses 3 are directed in pairs in opposite senses. A body 4, which here has the form of a pontoon, cooperates with the column 1 with a view to obtaining a relative linear displacement between the two components. To this end a supporting structure 6, formed of a number of uprights 7 with transverse connections 8, has been fastened to the pontoon 4, vertically to the surface 5. This supporting structure 6 forms a cage inside which the column 1 is adapted to move. The pontoon 4 is provided with an opening 9, lying vertically below the supporting structure 6, so that the column 1 can be moved upwards and downwards through the pontoon.

Engaging the recesses 3 of the columns may be pawl members constructed in the form of beams 10 and 11. The beams 10 form the driving pawl members and the beams 11 the blocking pawl members; this implies that by means of the first-mentioned beams, in a way to be described further below, a relative longitudinal displacement is produced between the pontoon 4 and the columns 1 in question, whilst by means of the blocking pawl members the pontoon and the columns are locked in relation to each other. The beams 10 and 11 are located along two facing sides of each column and at their ends are enclosed in crossheads 12 and 13 respectively, adapted to slide vertically between the uprights 7 of the structure 6. Each crosshead 12 of the driving pawl members is connected via a coupling 14 with a piston rod 15 forming part of a double-acting cylinder 16, which is secured on the supporting structure 6. With the aid of hydraulic pressure medium the crossheads 12, and accordingly the beams 10, can be moved up and down.

In order to bring the beams 10 into and out of engagement with the recesses 3 of the column 1, the ends of these beams are slidably supported in the crossheads 12 in a direction at right angles to the sides along which these beams are adapted to move. By means of a hydraulic or pneumatic cylinder 20 each beam end can be shifted in the crosshead and thus get clear of or engage a recess 3 of the column 1.

Each crosshead 13 of the blocking pawl members 11 is connected via a coupling 17 with a piston rod 18 forming part of a double-acting cylinder 19, which is secured on the supporting structure 6. With the aid of hydraulic pressure medium the crossheads 13, and accordingly the beams 11, can be vertically adjusted, so as to place the beam 11 exactly in front of a recess 3. Just as in the case of the beams 10, in order to bring the beams 11 into and out of engagement their ends are slidably supported in the crossheads 13. Further hydraulic or pneumatic cylinders 20, are also present in the crossheads 13 with a view to moving the beams 11 towards the column 1 and away from it.

In the embodiment illustrated in the drawing the position of the cylinders 16 is exactly the reverse of that of the cylinders 19. The latter are located underneath the deck 5 of the pontoon 4 and are secured to the uprights 7 of the supporting structure. It is also possible to give the cylinders 19 the same position as the cylinders 16. The stroke of the piston rods 18 is at least equal to the pitch of the recesses 3, so that the beams 11 can always be made to engage a recess.

The stroke of the piston rods 15 is greater than that of the piston rods 18 and is preferably at least twice the pitch of the recesses 3. The opposite position of the cylinders 16 and 19 presents the advantage that one cylinder can help on the operation of the other cylinder, with the maximum force to be exerted by one cylinder (i.e. by means of pressure medium on the rodless side of the piston) acting in the same direction as the smaller force exerted by the other cylinder (i.e. on the crosshead side of the piston). When the positions of the cylinders 16 and 19 are the same, this has the advantage that a greater force can be exerted in one direction than in the other. These points are of importance under certain circumstances to be mentioned below.

The apparatus operates as follows. The pontoon 4 is conveyed to its destination along with the columns 1, which may or may not have been fitted in the holes 9. If the columns have already been fitted in the holes 9 of the pontoon, the weight of the columns is taken by the beams 11, which have been made to engage the recesses 3. When the pontoon has arrived at its destination, liquid is admitted on the rod side of the pistons in the cylinders 16, in consequence of which the crossheads 12 are moved upwards along with the beams 10 present therein in the retracted position. The position of the crossheads 12 in relation to the column 1 is determined in such a way that the beams 10 are located exactly in front of a recess 3. These beams are subsequently displaced in the transverse direction until they engage the recess. Liquid is then supplied on the cover side and discharged on the rod side of the pistons in the cylinders 16, the column being displaced downwards in relation to the pontoon 4 through a distance equal to the length of the stroke of these pistons. At the end of this stroke the beams 11 of the crossheads 13 are made to engage the recess 3 present there. Then the pressure in the cylinders 16 is gradually reduced, so that the force exerted by column 1 upon the pontoon 4 is taken by the beams 11 acting as blocking pawl members. The beams 10 can subsequently be retracted in the transverse direction from the recesses 3 and pressure medium can be supplied on the rod side of the pistons in the cylinders 16, in consequence of which the crossheads 16 return to their highest position. In this position the beams 10 are again made to engage the recesses 3 present there, upon which in two different ways the force present between the pontoon 4 and the column 1 can be transmitted from the blocking pawl members 11 to the beams 10 acting as driving pawl members. One of these methods consists in that pressure medium is supplied to the cylinders 16 in such a way that the beams 10 take over the load on the beams 11 until the beams 11 lie without tension in the respective recesses 3, upon which these beams can be retracted in the transverse direction and further pressure medium can be supplied to the cylinders 16. The other method consists in that the pressure medium which had so far been enclosed in the cylinders 19 is gradually discharged, in consequence of which the column 1 may receive a small displacement in relation to the pontoon, so that the force between the column and the pontoon is transmitted to the beam 10 that is in engagement with the recess. When the beams 11 have thus been fully relieved, they can be retracted in the transverse direction, upon which the piston rods 15 can perform a working stroke. The speed of this operation of lowering the columns (as well as the lifting operation carried out in the opposite direction) can be increased by causing the beams 11 to perform a working stroke in the desired direction during the inoperative stroke of the beams 10. In this way the loss of time due to the inoperative strokes of the beams 10, and likewise of the beams 11, is eliminated.

The cycle of operations referred to in the above is repeated when the columns move down in the water and when the lower ends of these columns penetrate into the bottom of the lake or the sea where the pontoon is located. During the latter phase the resistance to the downward movement of the columns steadily increases. This increase need not be identical for different columns. This makes it possible that the force of reaction exerted by the columns upon the pontoon 4 via the cylinders 16 and the structure 6 may not always be identical for each of the columns. The auxiliary cylinders 19 can then be used to advantage to increase the force to be exerted by each individual column.

If a column offers very great resistance to its penetration into the soil (e.g. because the column in question has almost reached its maximum depth of penetration) pressure medium is supplied to the cylinders 16 and to the cylinders 19 of the respective column, while all or some of the other columns are kept blocked. In consequence a larger portion of the total weight of the apparatus will be transmitted to the respective column via the supporting structure 6 and the cylinders 16 than would be the case if the load were uniformly distributed. When the beams 11 of the crossheads 13 of the column in question have also been brought into engagement, the cylinders 19 help to transmit a larger portion of the weight of the whole apparatus to the column. This involves the further advantage that the load on each strip 2 is distributed over two crenel-shaped teeth.

When each column in succession has reached its position of maximum penetration into the soil, the pontoon 4 is fixed on each of these columns by means of the vertically adjustable beams 11. Since the nearest recess 3 of the different columns will not always lie at the same level above the deck 5, by means of the cylinders 19 an adjustment of the beams 11 can be brought about until the latter lie exactly in front of a recess 3. The beams 11 are subsequently displaced in the transverse direction until they engage the respective recess 3. Upon this the pontoon can be lifted to the desired height above the water level. This lifting operation can now take place with a speed at least equal to the pitch length per cycle, because, irrespective of an unfavourable position of the nearest recess 3, each beam 10 is able to perform a working stroke of at least one pitch length. When this lifting operation has taken place, the beams 11 must be made to engage a recess 3 for the last time. This is followed by a mechanical locking of the beams 11, and possibly of the beams 10, in relation to the pontoon 4 and the supporting structure 6 respectively, after the load has previously been equally distributed between the beams 10 and the beams 11 by the admission of pressure medium on the rod side of the pistons in the cylinders 19.

When the operations with the pontoon are complete and the equipment has to be moved again, the columns 1 have to be pulled out of the soil. To this end the pontoon is first lowered gradually once more, until it floats on the surface of the water. In the lowermost position of the crossheads 12 the beams 10 are subsequently made to engage a recess 3, again upon which pressure medium is supplied on the rod side of the pistons in the cylinders 16. If with a view to pulling up a column a large portion of the upward thrust exerted by the water upon the pontoon 4 has to be used, or if via the other columns still in the soil an additional pulling force has to be exerted upon the column to be lifted, use may be made of the cylinders 19, the pistons of which may operate with the full surface of the cover side to cause this pulling movement.

The function of the auxiliary cylinders 19 therefore is at least two-fold. In the first place the beams 11 can be placed exactly in front of a recess 3 of the respective column by means of these cylinders. In the second place an additional force can thus be exerted in support of the function of the working cylinders 16, which is of particular importance when the column has to be pulled out of the soil, since for this purpose only the piston surface on the rod side of the working cylinder is available. Through their contrary positions the cylinders 16 and 19 complement each other in a compensatory way. Further it is favourable that when a great force is exerted upon a column, the load for each strip 2 is distributed over two crenel-shaped teeth.

What I claim is:

1. Apparatus comprising a body, at least one straight supporting structure mounted on said body and extending upwardly therefrom, a column movably supported by said supporting structure, said column having at least three plane sides, a pair of spaced apart upwardly extending strips having alternating rectangular teeth and recesses secured to each of at least two of said plane sides, said teeth extending outwardly from said column, guide means forming a part of said supporting structure positioned adjacent to each of said pairs of strips, a lower set of cross-heads each of which is slidably mounted in a different one of said guide means adjacent to said body, an upper set of cross-heads each of which is slidably mounted in a different one of said guide means adjacent to the end of said structure remote from said body, beams movably carried by said lower sets of cross-heads, beams movably carried by said upper sets of cross-heads, each end of each beam being adapted to be moved into and out of the recesses of the strip adjacent thereto, first fluid pressure operated means carried by each cross-head and connected to move one end of each of said beams into and out of said recesses, and second fluid pressure operated means connected to move all of the cross-heads of at least one set of said lower and upper sets of cross-heads longitudinally of said guide means over a distance at least equal to the pitch of said teeth on said strips.

2. Apparatus as defined in claim 1 in which said second fluid pressure operated means is capable of moving said one set of cross-heads longitudinally of said guide means a distance of at least twice the pitch of said teeth.

3. Apparatus as defined in claim 2, comprising driving means connected to move the other set of cross-heads longitudinally of said guide means a distance at least equal to the pitch of said teeth.

4. Apparatus as defined in claim 3, in which said second fluid pressure operated means consists of a cylinder, a piston and a piston rod connected to each cross-head, the piston rods connected to the lower set of cross-heads and the piston rods connected to the upper set of cross-heads extending in opposite directions.

References Cited in the file of this patent
UNITED STATES PATENTS

| | | |
|---|---|---|
| 2,501,603 | Howard | Mar. 21, 1950 |
| 2,540,679 | Laffaille | Feb. 6, 1951 |
| 2,822,670 | Suderow | Feb. 11, 1958 |
| 2,870,639 | Suderow | Jan. 27, 1959 |
| 2,947,148 | Young | Aug. 2, 1960 |